(12) United States Patent
Wang

(10) Patent No.: US 11,930,307 B2
(45) Date of Patent: Mar. 12, 2024

(54) IMAGE PROCESSING METHOD AND APPARATUS, ELECTRONIC DEVICE AND COMPUTER-READABLE STORAGE MEDIUM

(71) Applicant: Beijing Baidu Netcom Science and Technology Co., Ltd., Beijing (CN)

(72) Inventor: Kangkang Wang, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 142 days.

(21) Appl. No.: 17/204,122

(22) Filed: Mar. 17, 2021

(65) Prior Publication Data
US 2021/0203900 A1    Jul. 1, 2021

(30) Foreign Application Priority Data

Apr. 17, 2020   (CN) .......................... 202010305880.9

(51) Int. Cl.
*H04N 9/67*   (2023.01)
*G06T 3/40*   (2006.01)
*G06T 5/50*   (2006.01)

(52) U.S. Cl.
CPC ............. *H04N 9/67* (2013.01); *G06T 3/4007* (2013.01); *G06T 5/50* (2013.01);
(Continued)

(58) Field of Classification Search
CPC ........... H04N 9/67; G06T 3/4007; G06T 5/50; G06T 2207/10024
(Continued)

(56) References Cited

U.S. PATENT DOCUMENTS 5,838,299 A    11/1998  Smith et al.
2004/0042686 A1  5/2004  Hamilton, Jr. et al.
(Continued)

FOREIGN PATENT DOCUMENTS

CA    3058010 A1 * 10/2018  ............. G06F 17/16
CN    101923455 A   12/2010
(Continued)

OTHER PUBLICATIONS

Boer, Deep Learning: Recurrent Batch Normalization, 2016, http://sebastiaanboer.com/deep%20learning/2016/03/03/recurrent-batch-normalization.html (Year: 2016).*
(Continued)

*Primary Examiner* — Allen Porter
*Assistant Examiner* — Daniel Tehrani
(74) *Attorney, Agent, or Firm* — Quinn IP Law

(57) ABSTRACT

The present application provides an image processing method, an image processing apparatus, an electronic device and a computer-readable storage medium, and relates to the field of image processing technologies. An implementation includes: acquiring an image to be processed; converting the image to be processed into a three-channel YUV image; performing a convolution operation on a Y-channel image, a U-channel image and a V-channel image in the three-channel YUV image to generate an R-channel image, a G-channel image and a B-channel image, respectively, and acquiring a three-channel RGB image; and pre-processing the three-channel RGB image. According to the present application, the image pre-processing speed can be improved.

16 Claims, 3 Drawing Sheets

(52) U.S. Cl.
CPC ............... *G06T 2207/10024* (2013.01); *G06T 2207/20021* (2013.01); *G06T 2207/20221* (2013.01)

(58) Field of Classification Search
USPC ......................................................... 382/162
See application file for complete search history.

(56) References Cited

U.S. PATENT DOCUMENTS

| | | | | |
|---|---|---|---|---|
| 2005/0013497 A1* | 1/2005 | Hsu | ..................... | H04N 19/577 |
| | | | | 375/E7.148 |
| 2005/0285813 A1 | 12/2005 | Obinata | | |
| 2010/0277500 A1 | 11/2010 | Otsuka et al. | | |
| 2012/0092335 A1* | 4/2012 | Kim | ....................... | H04N 13/15 |
| | | | | 345/419 |
| 2016/0037044 A1* | 2/2016 | Motta | .................. | H04N 25/585 |
| | | | | 348/221.1 |
| 2016/0277613 A1 | 9/2016 | Hayashi et al. | | |
| 2020/0134797 A1* | 4/2020 | Zhang | ................... | G06F 18/214 |
| 2020/0342572 A1* | 10/2020 | Chen | ........................ | G06N 3/08 |
| 2022/0086463 A1* | 3/2022 | Coban | .................... | G06N 3/045 |

FOREIGN PATENT DOCUMENTS

| | | | | | |
|---|---|---|---|---|---|
| CN | 102281382 | A | | 12/2011 | |
| CN | 106331532 | A | | 1/2017 | |
| CN | 106447606 | A | * | 2/2017 | |
| CN | 106960243 | A | * | 7/2017 | ........... G06N 3/0454 |
| CN | 107220934 | A | | 9/2017 | |
| CN | 107680031 | A | * | 2/2018 | ............... G06T 1/20 |
| CN | 108111859 | A | * | 6/2018 | ............. H04N 19/42 |
| CN | 108364270 | A | * | 8/2018 | ............. G06T 5/001 |
| CN | 108846842 | A | * | 11/2018 | ........... G06N 3/0454 |
| CN | 108921283 | A | * | 11/2018 | ......... G06F 16/2264 |
| CN | 108960258 | A | * | 12/2018 | |
| CN | 109472270 | A | | 3/2019 | |
| CN | 109697727 | A | * | 4/2019 | ........... G06N 3/0454 |
| CN | 109918752 | A | * | 6/2019 | |
| CN | 109948692 | A | | 6/2019 | |
| CN | 114596210 | A | * | 6/2022 | |
| CN | 115115514 | A | * | 9/2022 | |
| JP | 2010034713 | A | | 2/2010 | |
| JP | 2011124865 | A | * | 6/2011 | |
| JP | 2011155691 | A | | 8/2011 | |
| JP | 2012108898 | A | | 6/2012 | |
| JP | 2012175310 | A | | 9/2012 | |
| JP | 2015154425 | A | | 8/2015 | |
| JP | 2016115304 | A | | 6/2016 | |
| JP | 2016178553 | A | | 10/2016 | |
| JP | 2022145825 | A | * | 10/2022 | |
| WO | WO-9635203 | A1 | * | 11/1996 | ............. G09G 5/395 |
| WO | WO 9635203 | A1 | * | 11/1996 | ............. G09G 5/395 |
| WO | WO-2017209548 | A1 | * | 12/2017 | ............. G06F 17/10 |

OTHER PUBLICATIONS

The extended European Search report for European application No. EP21162731 dated Sep. 10, 2021.
Han Ze, Lin Suzhen, Huang Fusheng, Zhao Jingchao, Liu Zhen, "Multiband Image Fusion Results Colorization Based on Convolution Neural Network," School of Data Science, North University of Chiina, Tai Yuan 030051, China, Dec. 11, 2017.
Japanese Office Action for Japanese application No. JP2021-040312, dated May 12, 2022.
Chinese Office Action for Chinese application No. CN2020103058809, dated Jan. 20, 2023.

* cited by examiner

IMAGE PROCESSING METHOD AND APPARATUS, ELECTRONIC DEVICE AND COMPUTER-READABLE STORAGE MEDIUM

CROSS-REFERENCE TO RELATED APPLICATION

This application claims a priority to Chinese Patent Application No. 202010305880.9 filed on Apr. 17, 2020, the disclosure of which is incorporated in its entirety by reference herein.

TECHNICAL FIELD

The present application relates to the field of image processing technologies, in particular to an image processing method, an image processing apparatus, an electronic device and a computer-readable storage medium.

BACKGROUND

In the current computer vision technologies, image pre-processing is an essential step. Currently, a common image pre-processing manner includes: for each pixel in an image to be processed, such processes as data formatting, RGB conversion, and data normalization are performed sequentially. However, more processing time may be consumed in such manner, thereby resulting in slow processing speed.

SUMMARY

The present application provides an image processing method, an image processing apparatus, an electronic device and a computer-readable storage medium, to solve a problem of slow processing speed in a current image pre-processing manner.

In order to solve the above technical problem, the present application is implemented as follows.

In a first aspect, the present application provides in an embodiment an image processing method, including: acquiring an image to be processed; converting the image to be processed into a three-channel YUV image; performing a convolution operation on a Y-channel image, a U-channel image and a V-channel image in the three-channel YUV image to generate an R-channel image, a G-channel image and a B-channel image, respectively, and acquiring a three-channel RGB image; and pre-processing the three-channel RGB image.

In this way, in an image pre-processing process, the Y-channel image, U-channel image and V-channel image in the converted three-channel YUV image may be processed by using the convolution operation to generate the three-channel RGB image. The three-channel RGB image is pre-processed. Thus, the time for converting the YUV image into RGB image may be shortened, thereby increasing the image pre-processing speed.

Optionally, the converting the image to be processed into the three-channel YUV image includes: dividing the image to be processed into a first Y-channel image and a UV-channel image; adjusting the first Y-channel image to acquire a Y-channel image having dimensions of (N, 1, W, H); splitting the UV-channel image to acquire a U-channel image having dimensions of (N, 1, W*0.5, H*0.5) and a V-channel image having the dimensions of (N, 1, W*0.5, H*0.5); performing double sampling on the U-channel image having the dimensions of (N, 1, W*0.5, H*0.5) and the V-channel image having the dimensions of (N, 1, W*0.5, H*0.5) to acquire a U-channel image having the dimensions of (N, 1, W, H) and a V-channel image having the dimensions of (N, 1, W, H) respectively; and merging the Y-channel image having the dimensions of (N, 1, W, H), the U-channel image having the dimensions of (N, 1, W, H) and the V-channel image having the dimensions of (N, 1, W, H) to acquire a YUV image having dimensions of (N, 3, W, H); where, N represents the number of images to be processed, 1 represents that there is 1 channel in the Y-channel image, the U-channel image, or the V-channel image, 3 represents that there are 3 channels in the YUV image, W is a width of the image to be processed, and H is a height of the image to be processed.

In this way, through the above splitting, sampling and merging processes, the three-channel YUV image that meets the requirements of the subsequent convolution operation may be acquired efficiently.

Optionally, the splitting the UV-channel image to acquire the U-channel image having the dimensions of (N, 1, W*0.5, H*0.5) and the V-channel image having the dimensions of (N, 1, W*0.5, H*0.5) includes: adjusting the UV-channel image to be a UV-channel image having dimensions of (N, 2, W*H*0.25); splitting the UV-channel image having the dimensions of (N, 2, W*H*0.25) to acquire a U-channel image having dimensions of (N, 1, W*H*0.25) and a V-channel image having dimensions of (N, 1, W*H*0.25); and adjusting the U-channel image having the dimensions of (N, 1, W*H*0.25) to be the U-channel image having the dimensions of (N, 1, W*0.5, H*0.5), and adjusting the V-channel image having the dimensions of (N, 1, W*H*0.25) to be the V-channel image having the dimensions of (N, 1, W*0.5, H*0.5).

Optionally, the performing double sampling on the U-channel image having the dimensions of (N, 1, W*0.5, H*0.5) and the V-channel image having the dimensions of (N, 1, W*0.5, H*0.5) to acquire the U-channel image having the dimensions of (N, 1, W, H) and the V-channel image having the dimensions of (N, 1, W, H) respectively includes: performing nearest neighbor double up-sampling on the U-channel image having the dimensions of (N, 1, W*0.5, H*0.5) and the V-channel image having the dimensions of (N, 1, W*0.5, H*0.5) by using a nearest interpolation function to acquire the U-channel image having the dimensions of (N, 1, W, H) and the V-channel image having the dimensions of (N, 1, W, H) respectively.

In this way, the required U-channel image and V-channel image may be accurately sampled and acquired by performing nearest neighbor double up-sampling using the nearest interpolation function.

Optionally, the pre-processing the three-channel RGB image includes: pre-processing the three-channel RGB image by using a batch normalization function.

In this way, by using the batch normalization function, a unified pre-processing of the three-channel RGB image may be realized, thereby accelerating the pre-processing process.

Optionally, the batch normalization function is:

$$output = \frac{input - mean}{\sqrt{variance^2 + epsilon}} * scale - bias$$

where, output represents a pixel value of a pre-processed image, input represents a pixel value of an image before being pre-processed, scale represents a scaling coefficient, bias represents a bias value, mean represents a mean value, variance represents a variance, and epsilon represents a preset numerical stability coefficient for division algorithm.

Optionally, subsequent to the acquiring the three-channel RGB image, the method further includes: resizing the three-channel RGB image; where the pre-processing the three-channel RGB image includes: pre-processing the resized three-channel RGB image.

In a second aspect, the present application provides in an embodiment an image processing apparatus, including: an acquisition module, configured to acquire an image to be processed; a conversion module, configured to convert the image to be processed into a three-channel YUV image; an operation module, configured to perform a convolution operation on a Y-channel image, a U-channel image and a V-channel image in the three-channel YUV image to generate an R-channel image, a G-channel image and a B-channel image, respectively, and acquiring a three-channel RGB image; and a pre-processing module, configured to pre-process the three-channel RGB image.

Optionally, the conversion module includes: a division unit, configured to divide the image to be processed into a first Y-channel image and a UV-channel image; an adjustment unit, configured to adjust the first Y-channel image to acquire a Y-channel image having dimensions of (N, 1, W, H); a splitting unit, configured to split the UV-channel image to acquire a U-channel image having dimensions of (N, 1, W*0.5, H*0.5) and a V-channel image having dimensions of (N, 1, W*0.5, H*0.5); a sampling unit, configured to perform double sampling on the U-channel image having the dimensions of (N, 1, W*0.5, H*0.5) and the V-channel image having the dimensions of (N, 1, W*0.5, H*0.5) to acquire a U-channel image having dimensions of (N, 1, W, H) and a V-channel image having dimensions of (N, 1, W, H) respectively; and a merging unit, configured to merge the Y-channel image having the dimensions of (N, 1, W, H), the U-channel image having the dimensions of (N, 1, W, H) and the V-channel image having the dimensions of (N, 1, W, H) to acquire a YUV image having dimensions of (N, 3, W, H); where, N represents the number of images to be processed, 1 represents that there is 1 channel in the Y-channel image, the U-channel image, or the V-channel image, and 3 represents that there are 3 channels in the YUV image, W is a width of the image to be processed, and H is a height of the image to be processed.

Optionally, the splitting unit includes: a first adjustment sub-unit, configured to adjust the UV-channel image to be a UV-channel image having dimensions of (N, 2, W*H*0.25); a splitting sub-unit, configured to split the UV-channel image having the dimensions of (N, 2, W*H*0.25) to acquire a U-channel image having dimensions of (N, 1, W*H*0.25) and a V-channel image having dimensions of (N, 1, W*H*0.25); and a second adjustment sub-unit, configured to adjust the U-channel image having the dimensions of (N, 1, W*H*0.25) to be the U-channel image having the dimensions of (N, 1, W*0.5, H*0.5), and adjusting the V-channel image having the dimensions of (N, 1, W*H*0.25) to be the V-channel image having the dimensions of (N, 1, W*0.5, H*0.5).

Optionally, the sampling unit is further configured to: perform nearest neighbor double up-sampling on the U-channel image having the dimensions of (N, 1, W*0.5, H*0.5) and the V-channel image having the dimensions of (N, 1, W*0.5, H*0.5) by using a nearest interpolation function to acquire the U-channel image having the dimensions of (N, 1, W, H) and the V-channel image having the dimensions of (N, 1, W, H) respectively.

Optionally, the pre-processing module is further configured to: pre-process the three-channel RGB image by using a batch normalization function.

Optionally, the batch normalization function is:

$$\text{output} = \frac{\text{input} - \text{mean}}{\sqrt{\text{variance}^2 + \text{epsilon}}} * \text{scale} - \text{bias}$$

where, output represents a pixel value of a pre-processed image, input represents a pixel value of an image before being pre-processed, scale represents a scaling coefficient, bias represents a bias value, mean represents a mean value, variance represents a variance, and epsilon represents a preset numerical stability coefficient for division algorithm.

Optionally, the apparatus further includes: an adjustment module, configured to resize the three-channel RGB image; where the pre-processing module is further configured to: pre-process the resized three-channel RGB image.

In a third aspect, the present application provides in an embodiment an electronic device, including: at least one processor; and a memory communicatively coupled to the at least one processor; where, the memory stores thereon an instruction that is executable by the at least one processor, and the instruction, when executed by the at least one processor, causes the at least one processor to perform the above-mentioned method.

In a fourth aspect, the present application provides in an embodiment a non-transitory computer-readable storage medium having stored a computer instruction thereon. The computer instruction is configured to be executed to cause a computer to perform the above-mentioned method.

An embodiment of the present application described above has the following advantages or beneficial effects. In the process of the image pre-processing, the Y-channel image, U-channel image and V-channel image in the converted three-channel YUV image may be processed by using the convolution operation to generate the three-channel RGB image. The three-channel RGB image is further pre-processed. Thus, the time for converting the YUV image into RGB image may be shortened, thereby increasing the image pre-processing speed. An image to be processed is acquired, the image to be processed is converted into a three-channel YUV image, a convolution operation is performed on a Y-channel image, a U-channel image and a V-channel image in the three-channel YUV image to generate an R-channel image, a G-channel image and a B-channel image, respectively, and a three-channel RGB image is acquired, and the three-channel RGB image is pre-processed, so as to solve the problem of slow processing speed in the current image pre-processing manner, thereby achieving the technical effect of improving the image pre-processing speed.

Other effects of the above optional implementation will be described below with reference to specific embodiments.

BRIEF DESCRIPTION OF THE DRAWINGS

Drawings are included to provide a better understanding of the present application and are not construed as a limitation to the present application, in the drawings.

DETAILED DESCRIPTION

Exemplary embodiments of the present application are described below in conjunction with the drawings, including various details of embodiments of the present application to facilitate understanding, which are considered merely exemplary. Accordingly, one of ordinary skill in the art should appreciate that various changes and modifications may be made to the embodiments described herein without departing from the scope and spirit of the present application. Furthermore, descriptions of well-known functions and structures are omitted from the following description for clarity and conciseness.

Terms such as "first" and "second" in the description and claims of the present application are used to differentiate similar objects, and not necessarily used to describe a specific sequence or order. It should be appreciated that the data used in this way may be interchanged under an appropriate circumstance, so that an embodiment of the present application described herein, for example, may be implemented in a sequence other than those illustrated or described herein. Moreover, terms "include", "have" and any other variation thereof are intended to encompass non-exclusive inclusion, such that a process, method, system, product or device including a series of steps or units not only includes those steps or elements, but also includes other steps or units not explicitly listed, or steps or units inherent in the process, method, system, product or device.

Figure 1:
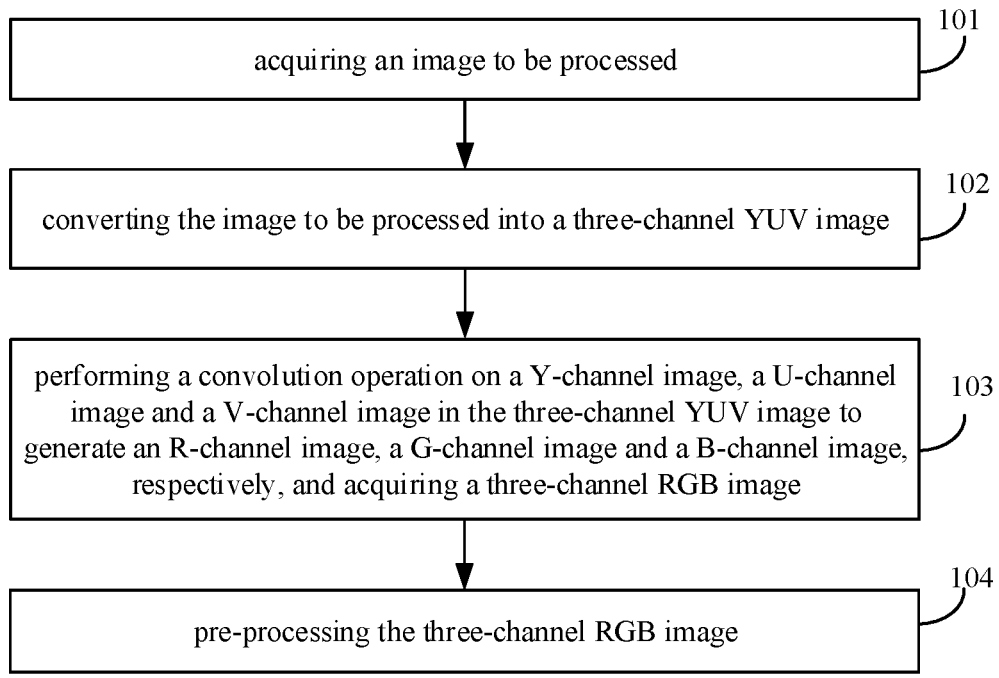
FIG. 1 is a flow chart illustrating an image processing method according to an embodiment of the present application.

Referring to FIG. 1, FIG. 1 is a flow chart illustrating an image processing method according to an embodiment of the present application. The method is applied to an electronic device. As shown in FIG. 1, the method includes the following steps.

Step 101, acquiring an image to be processed.

In the embodiment, the image to be processed may be acquired by a camera device, or may be directly acquired from other apparatuses such as a device at a server side. The image to be processed may be, but not limited to, a facial image, an object image or a landscape image.

In an implementation, after the image to be processed is acquired, a format of the image to be processed may be adjusted. For example, the format of the image to be processed may be adjusted to be dimensions of (W*H*1.5) and a data type may be adjusted to be an array including 8-bit unsigned integer (uint8). W is a width of the image to be processed, and H is a height of the image to be processed.

Step 102, converting the image to be processed into a three-channel YUV image.

The YUV image converted in this step may be a YUV image having dimensions of (N, 3, W, H). N represents the number of images to be processed, 3 represents there are 3 channels in the YUV image, W represents a width of the YUV image (being equal to the width of the image to be processed), and H represents a height of the YUV image (being equal to the height of the image to be processed).

There may be multiple formats for the YUV image, including YUV444, YUV422, YUV420, NV12, etc. There are different pixel arrangements for different formats of the YUV image. For example, a format of the YUV image format may be YUV420 in this embodiment, and a pixel arrangement thereof is that Y-channel pixels and UV-channel pixels are arranged alternately in columns.

Step 103, performing a convolution operation on a Y-channel image, a U-channel image and a V-channel image in the three-channel YUV image to generate an R-channel image, a G-channel image and a B-channel image, respectively, and acquiring a three-channel RGB image.

In this embodiment, in this step, the convolution operation may be performed on the three-channel YUV image by using the following convolution function (a conv2d function) to generate the R-channel image, the G-channel image and the B-channel image, respectively, so as to acquire the three-channel RGB image:

$$RGB\_img = w \otimes YUV\_img + b$$

where, RGB_img represents the three-channel RGB image, YUV_img represents the three-channel YUV image, w and b each represents a determined parameter matrix, and $\otimes$ represents a convolution symbol. Dimensions of a convolution kernel are (1, 1, 3, 3) in the convolution operation of this embodiment. That is, a size of the convolution kernel is 1*1, the number of input channels is 3, and the number of output channels is 3.

Figure 2:
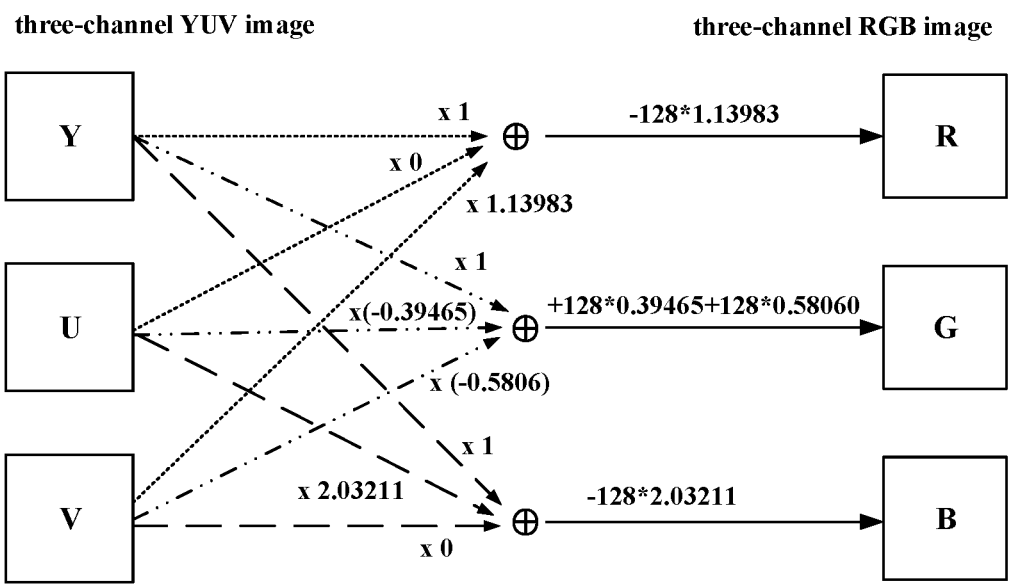
FIG. 2 is a schematic diagram of a convolution operation process in a specific example of the present application.

Optionally, the above w parameter matrix may be: [[1, 0, 1.13983], [1, −0.39465, −0.58060], [1, 2.03211, 0]]. Optionally, the above b parameter matrix may be: [−128*1.13983, 128*0.39465+128*0.58060, −128*2.03211]. In this case, as shown in FIG. 2, a corresponding convolution operation process (an input is the three-channel YUV image, an output is the three-channel RGB image) may include:

$$R = Y + 1.13983*(V-128);$$

$$G = Y - 0.39465*(U-128) - 0.58060*(V-128);$$

$$B = Y + 2.03211*(U-128).$$

Step 104, pre-processing the three-channel RGB image.

In this embodiment, the pre-processed image may be used for image target detection, video target detection and analysis, etc. The pre-processing process may include image normalization processing. The pre-processing process in this step may be: pre-processing the three-channel RGB image by using a batch normalization function. In this way, by using the batch normalization function, a unified pre-processing of the three-channel RGB image may be realized, thereby accelerating the pre-processing process.

Optionally, the batch normalization function is:

$$output = \frac{input - mean}{\sqrt{variance^2 + epsilon}} * scale - bias,$$

where, output represents a pixel value of a pre-processed image, input represents a pixel value of an image before being pre-processed, scale represents a scaling coefficient, bias represents a bias value, mean represents a mean value, variance represents a variance, and epsilon represents a preset numerical stability coefficient for division algorithm. The scale, bias, mean, variance and epsilon may be preset.

As an optional implementation, parameters in the batch normalization function may be specifically set as follows. scale is [1/σ, 1/σ, 1/σ], bias is [μ1/σ, μ2/σ, μ3/σ], mean is [0, 0, 0], variance is [0.999995, 0.999995, 0.999995], and epsilon is 1e−5. Further, μ may be 128, and σ may be 256. The reason for setting epsilon to be 1e−5 is that in some cases, epsilon is not allowed to be smaller than 1e−5.

Optionally, after acquiring the three-channel RGB image, the method further includes: resizing the three-channel RGB image; where the pre-processing the three-channel RGB image includes: pre-processing the resized three-channel RGB image. In this way, sizes of the adjusted images may be guaranteed to be uniform, thereby improving the pre-processing speed.

As an optional implementation, before pre-processing the three-channel RGB image, a resize function may be called first to resize the three-channel RGB image, that is, the three-channel RGB image is adjusted to be of a specified size. For a specific form of the resize function, the existing commonly used forms may be selected, which is not limited herein.

According to the image processing method in the embodiments of the present application, in the image pre-processing process, the Y-channel image, U-channel image and V-channel image in the converted three-channel YUV image may be processed by using the convolution operation to generate the three-channel RGB image. The three-channel RGB image is pre-processed. Thus, the time for converting the YUV image into RGB image may be shortened, thereby increasing the image pre-processing speed.

In an embodiment of the present application, the step 102 of converting the image to be processed into the three-channel YUV image may include the following steps.

Dividing the image to be processed into a first Y-channel image and a UV-channel image. The division process may be understood as a pointer redirection. Dimensions of the first Y-channel image may be (W*H), and dimensions of the UV-channel image may be (W*H*0.5).

Adjusting the first Y-channel image to acquire a Y-channel image having dimensions of (N, 1, W, H), where N represents the number of images to be processed, 1 represents that there is 1 channel in the Y-channel image, W is a width of the Y-channel image, and H is a height of the Y-channel image. Optionally, a reshape function may be called to adjust the first Y-channel image in this embodiment.

Splitting the UV-channel image to acquire a U-channel image having dimensions of (N, 1, W*0.5, H*0.5) and a V-channel image having the dimensions of (N, 1, W*0.5, H*0.5), where 1 represents that there is 1 channel in the Y-channel image or the V-channel image, W*0.5 represents a width of the Y-channel image or the V-channel image, and H*0.5 represents a height of the Y-channel image or the V-channel image. Optionally, a split function may be called to split the UV-channel image in this embodiment.

Performing double sampling on the U-channel image having the dimensions of (N, 1, W*0.5, H*0.5) and the V-channel image having the dimensions of (N, 1, W*0.5, H*0.5) to acquire a U-channel image having the dimensions of (N, 1, W, H) and a V-channel image having the dimensions of (N, 1, W, H) respectively, where 1 represents that there is 1 channel in the Y-channel image or the V-channel image, W represents a width of the Y-channel image or the V-channel image, and H represents a height of the Y-channel image or the V-channel image.

Merging the Y-channel image having the dimensions of (N, 1, W, H), the U-channel image having the dimensions of (N, 1, W, H) and the V-channel image having the dimensions of (N, 1, W, H) to acquire a YUV image having dimensions of (N, 3, W, H), where, 3 represents that there are 3 channels in the YUV image, W is the width of the YUV image, and H is the height of the YUV image. Optionally, a concat function may be called to merge the Y-channel image having the dimensions of (N, 1, W, H), the U-channel image having the dimensions of (N, 1, W, H) and the V-channel image having the dimensions of (N, 1, W, H), so as to acquire the YUV image having the dimensions of (N, 3, W, H).

In this way, through the above splitting, sampling and merging processes, the three-channel YUV image that meets the requirements of the subsequent convolution operation may be acquired efficiently.

It should be appreciated that, the reshape function may be of an existing calling format, and may transform a specified matrix into a matrix of specific dimensions, in which the number of elements in the specified matrix remains unchanged, and the number of rows, the number of columns, and the number of dimensions of the specified matrix may be adjusted. The split function may be of an existing calling format, and may split the UV-channel image to acquire the U-channel image and the V-channel image. The concat function may be of an existing calling format, and usually used to connect or merge two or more arrays, so as to acquire a new array.

Optionally, in order to split the UV-channel image accurately, the process of splitting the UV-channel image to acquire the U-channel image having the dimensions of (N, 1, W*0.5, H*0.5) and the V-channel image having the dimensions of (N, 1, W*0.5, H*0.5) may include the following steps.

Adjusting the UV-channel image to be a UV-channel image having dimensions of (N, 2, W*H*0.25), where W*H*0.25 indicates that a width of the UV-channel image is W*0.5 and a height of the UV-channel image is H*0.5, and 2 represents that there are 2 channels in the UV-channel image.

Splitting the UV-channel image having the dimensions of (N, 2, W*H*0.25) to acquire a U-channel image having dimensions of (N, 1, W*H*0.25) and a V-channel image having dimensions of (N, 1, W*H*0.25), where W*H*0.25 indicates that a width of the U-channel image is W*0.5 and a height of the U-channel image is H*0.5, or a width of the V-channel image is W*0.5 and a height of the V-channel image is H*0.5, 1 represents that there is 1 channel in the Y-channel image or the V-channel image. Optionally, the split function may be called to split the UV-channel image having the dimensions of (N, 2, W*H*0.25) in this embodiment.

Adjusting the U-channel image having the dimensions of (N, 1, W*H*0.25) to be the U-channel image having the dimensions of (N, 1, W*0.5, H*0.5), and adjusting the V-channel image having the dimensions of (N, 1, W*H*0.25) to be the V-channel image having the dimensions of (N, 1, W*0.5, H*0.5). Optionally, the reshape function may be called to adjust the U-channel image having the dimensions of (N, 1, W*H*0.25) or the V-channel image having the dimensions of (N, 1, W*H*0.25) in this embodiment.

Optionally, the process of performing double sampling on the U-channel image having the dimensions of (N, 1, W*0.5, H*0.5) and the V-channel image having the dimensions of (N, 1, W*0.5, H*0.5) may include: performing nearest neighbor double up-sampling on the U-channel image having the dimensions of (N, 1, W*0.5, H*0.5) and the V-channel image having the dimensions of (N, 1, W*0.5, H*0.5) by using a nearest interpolation function, to acquire the U-channel image having the dimensions of (N, 1, W, H) and the V-channel image having the dimensions of (N, 1, W, H), respectively. In this way, the required U-channel image and V-channel image may be accurately sampled and acquired by performing nearest neighbor double up-sampling by using the nearest interpolation function.

Figure 3:
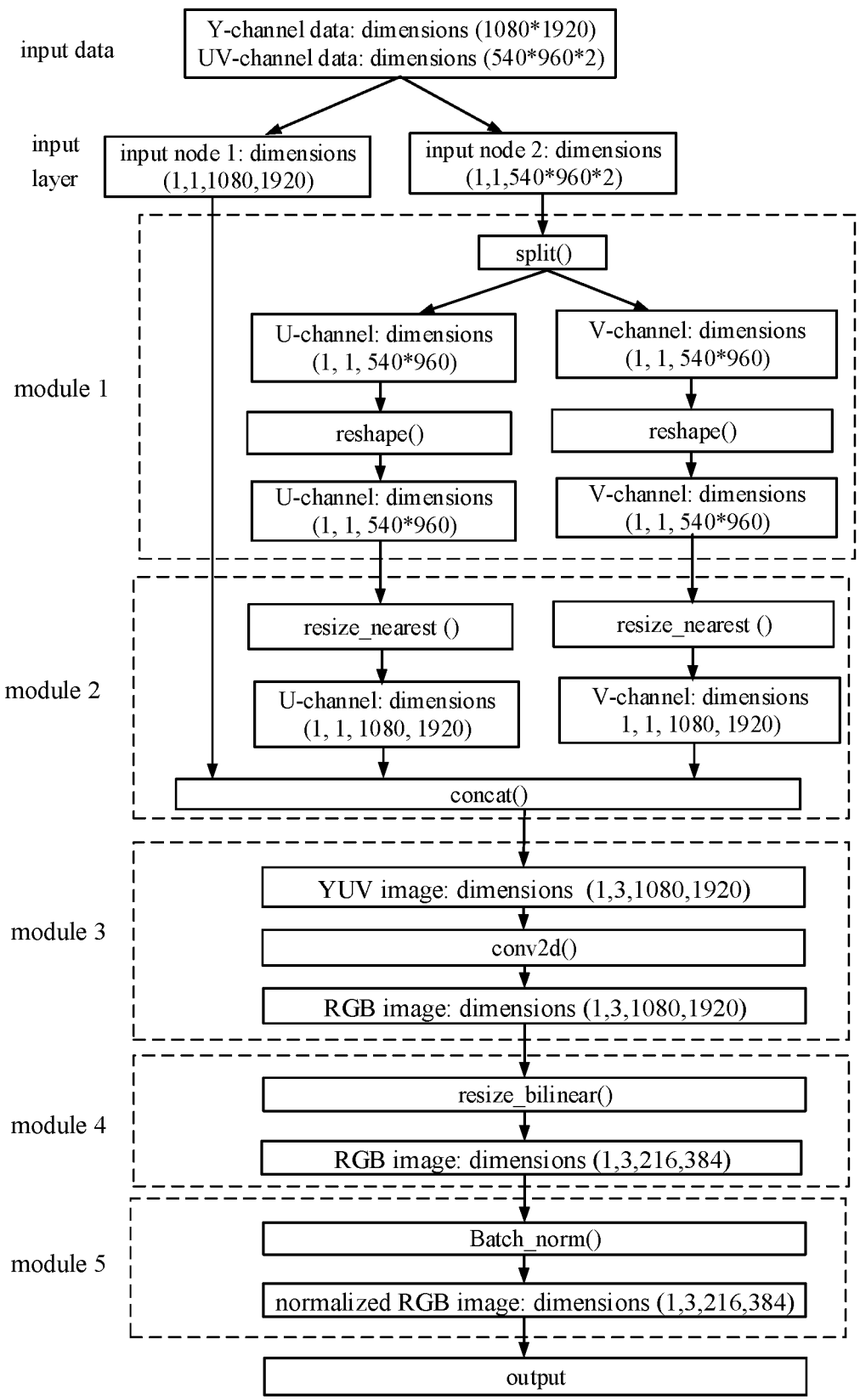
FIG. 3 is a flow chart of image conversion and pre-processing processes in a specific example of the present application.

An image conversion and pre-processing process in a specific example of the present application will be described below with reference to FIG. 3.

In the specific example of the present application, an example is given that the number of images to be processed is 1 and a size of the image to be processed is 1080*1920. The image conversion and pre-processing process may be achieved by calling functions in a neural network prediction library, and is described by using a neural network framework (such as PaddlePaddle). As shown in FIG. 3, the neural network framework includes an input layer, a module 1, a module 2, a module 3 (a convolution layer), a module 4 and a module 5 (a batch normalization layer), and the corresponding process may include the following steps.

The following steps are performed in the input layer. First, the image to be processed of 1080*1920 is divided into two parts, i.e., a Y-channel image having a dimension of (1080*1920) and a UV-channel image having a dimension of (540*960*2). Then, a reshape function is called to adjust the Y-channel image having the dimension of (1080*1920), and a Y-channel image having dimensions of (1, 1, 1080, 1920) is acquired, which is used as an input of an input node 1. A UV-channel image having dimensions of (1, 1, 540*960*2) is used as an input of an input node 2.

The following steps are performed in the module 1. First, a split function is called to split the UV-channel image at the input node 2, so as to acquire a U-channel image having dimensions of (1, 1, 540*960) and a V-channel image having dimensions of (N, 1, 540*960). Then, the reshape function is called to adjust the U-channel image having the dimensions of (1, 1, 540*960) to be a U-channel image having dimensions of (1, 1, 540, 960), and the reshape function is called to adjust the V-channel image having the dimensions of (1, 1, 540*960) to be a V-channel image having dimensions of (1, 1, 540, 960).

The following steps are performed in the module 2. First, nearest neighbor double up-sampling is performed on the U-channel image having the dimensions of (1, 1, 540, 960) and the V-channel image having the dimensions of (1, 1, 540, 960) by using a nearest interpolation function, to acquire a U-channel image having dimensions of (1, 1, 1080, 1920) and a V-channel image having dimensions of (1, 1, 1080, 1920), respectively. Then, a concat function is called to merge the Y-channel image having the dimensions of (1, 1, 1080, 1920), the U-channel image having the dimensions of (1, 1, 1080, 1920) and the V-channel image having the dimensions of (1, 1, 1080, 1920), so as to acquire a YUV image having dimensions of (1, 3, 1080, 1920).

The following steps are performed in the module 3. A convolution function, such as a conv2d function, is called to perform a convolution operation on the YUV image having the dimensions of (1, 3, 1080, 1920) to generate an R-channel image, a G-channel image and a B-channel image, respectively, and a three-channel RGB image having dimensions of (1, 3, 1080, 1920) is acquired.

In the module 4, a resize bilinear function is called to resize the RGB image having the dimensions of (1, 3, 1080, 1920) to be an RGB image having dimensions of (1, 3, 216, 384).

In the module 5, the RGB image having the dimensions of (1, 3, 216, 384) is pre-processed by using a batch normalization function, such as a Batch norm function, to acquire a normalized RGB image having dimensions of (1, 3, 216, 384).

In this way, the image pre-processing speed may be significantly improved by calling the functions in the neural network prediction library.

Figure 4:
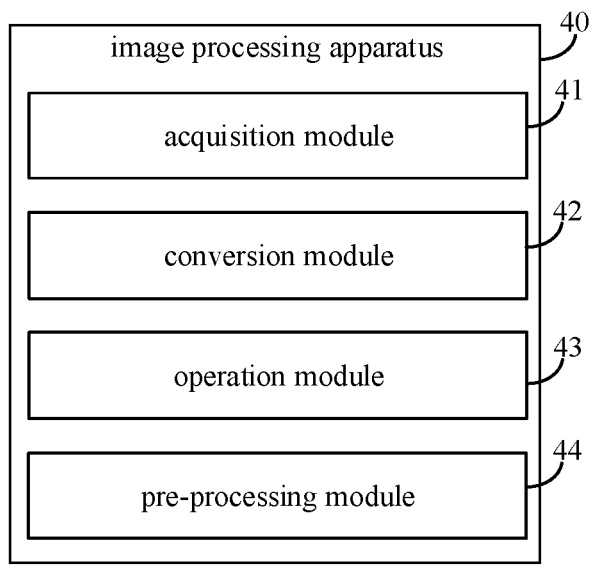
FIG. 4 is a block diagram of an image processing apparatus for implementing the image processing method in the embodiment of the present application.

Referring to FIG. 4, FIG. 4 is a block diagram of an image processing apparatus according to an embodiment of the present application. As shown in FIG. 4, the image processing apparatus 40 includes: an acquisition module 41, configured to acquire an image to be processed; a conversion module 42, configured to convert the image to be processed into a three-channel YUV image; an operation module 43, configured to perform a convolution operation on a Y-channel image, a U-channel image and a V-channel image in the three-channel YUV image to generate an R-channel image, a G-channel image and a B-channel image, respectively, and acquire a three-channel RGB image; and a pre-processing module 44, configured to pre-process the three-channel RGB image.

Optionally, the conversion module 42 includes: a division unit, configured to divide the image to be processed into a first Y-channel image and a UV-channel image; an adjustment unit, configured to adjust the first Y-channel image to acquire a Y-channel image having dimensions of (N, 1, W, H); a splitting unit, configured to split the UV-channel image to acquire a U-channel image having dimensions of (N, 1, W*0.5, H*0.5) and a V-channel image having dimensions of (N, 1, W*0.5, H*0.5); a sampling unit, configured to perform double sampling on the U-channel image having the dimensions of (N, 1, W*0.5, H*0.5) and the V-channel image having the dimensions of (N, 1, W*0.5, H*0.5) to acquire a U-channel image having dimensions of (N, 1, W, H) and a V-channel image having dimensions of (N, 1, W, H) respectively; and a merging unit, configured to merge the Y-channel image having the dimensions of (N, 1, W, H), the U-channel image having the dimensions of (N, 1, W, H) and the V-channel image having the dimensions of (N, 1, W, H) to acquire a YUV image having dimensions of (N, 3, W, H); where, N represents the number of images to be processed, 1 represents that there is 1 channel in the Y-channel image, the U-channel image, or the V-channel image, and 3 represents that there are 3 channels in the YUV image, W is a width of the image to be processed, and H is a height of the image to be processed.

Optionally, the splitting unit includes: a first adjustment sub-unit, configured to adjust the UV-channel image to be a UV-channel image having dimensions of (N, 2, W*H*0.25); a splitting sub-unit, configured to split the UV-channel image having the dimensions of (N, 2, W*H*0.25) to acquire a U-channel image having dimensions of (N, 1, W*H*0.25) and a V-channel image having dimensions of (N, 1, W*H*0.25); and a second adjustment sub-unit, configured to adjust the U-channel image having the dimensions of (N, 1, W*H*0.25) to be the U-channel image having the dimensions of (N, 1, W*0.5, H*0.5), and adjusting the V-channel image having the dimensions of (N, 1, W*H*0.25) to be the V-channel image having the dimensions of (N, 1, W*0.5, H*0.5)

Optionally, the sampling unit is further configured to: perform nearest neighbor double up-sampling on the U-channel image having the dimensions of (N, 1, W*0.5, H*0.5) and the V-channel image having the dimensions of (N, 1, W*0.5, H*0.5) by using a nearest interpolation function, to acquire the U-channel image having the dimensions of (N, 1, W, H) and the V-channel image having the dimensions of (N, 1, W, H), respectively.

Optionally, the pre-processing module 44 is further configured to: pre-process the three-channel RGB image by using a batch normalization function.

Optionally, the batch normalization function is:

$$output = \frac{input - mean}{\sqrt{variance^2 + epsilon}} * scale - bias$$

where, output represents a pixel value of a pre-processed image, input represents a pixel value of an image before being pre-processed, scale represents a scaling coefficient, bias represents a bias value, mean represents a mean value, variance represents a variance, and epsilon represents a preset numerical stability coefficient for division algorithm.

Optionally, the apparatus further includes: an adjustment module, configured to resize the three-channel RGB image; where the pre-processing module 44 is further configured to: pre-process the resized three-channel RGB image.

Understandably, the image processing apparatus 40 according to the embodiments of the present application can implement various processes in the embodiments of the method shown in FIG. 1, and achieve the same beneficial effects. To avoid repetition, details are not described herein again.

According to embodiments of the present application, the present application further provides an electronic device and a readable storage medium.

Figure 5:
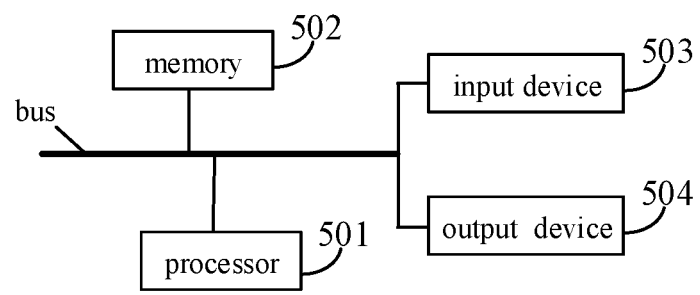
FIG. 5 is a block diagram of an electronic device for implementing the image processing method of the embodiment in the present application.

FIG. 5 is a block diagram of an electronic device for implementing the image processing method in the embodiment of the present application. The electronic device is intended to represent digital computers in various forms, such as a laptop computer, a desktop computer, a workstation, a personal digital assistant, a server, a blade server, a mainframe computer, and another suitable computer. The electronic device may further represent mobile apparatuses in various forms, such as personal digital processing, a cellular phone, a smart phone, a wearable device, and another similar computing apparatus. The components shown herein, connections and relationships thereof, and functions thereof are merely examples, and are not intended to limit the implementations of the present application described and/or required herein.

As shown in FIG. 5, the electronic device includes one or more processors 501, a memory 502, and an interface for connecting various components, including a high-speed interface and a low-speed interface. The components are connected to each other by using different buses, and may be installed on a common motherboard or in other ways as required. The processor may process an instruction executed in the electronic device, including an instruction stored in or on the memory to display graphical information of a GUI on an external input/output device (such as a display device coupled to an interface). In another implementation, if necessary, a plurality of processors and/or a plurality of buses may be used together with a plurality of memories. Similarly, a plurality of electronic devices may be connected, and each device provides some necessary operations (for example, used as a server array, a group of blade servers, or a multi-processor system). In FIG. 5, one processor 501 is used as an example.

The memory 502 is a non-transitory computer-readable storage medium provided in the present application. The memory stores an instruction that can be executed by at least one processor to perform the image processing method provided in the present application. The non-transitory computer-readable storage medium in the present application stores a computer instruction, and the computer instruction is executed by a computer to implement the image processing method provided in the present application.

As a non-transitory computer-readable storage medium, the memory 502 may be used to store a non-transitory software program, a non-transitory computer-executable program, and a module, such as a program instruction/module corresponding to the image processing method in the embodiment of the present application (for example, the acquisition module 41, the conversion module 42, the operation module 43 and the pre-processing module 44 shown in FIG. 4). The processor 501 executes various functional applications and data processing of the server by running the non-transient software program, instruction, and module that are stored in the memory 502, that is, implementing the image processing method in the foregoing method embodiments.

The memory 502 may include a program storage area and a data storage area. The program storage area may store an operating system and an application program required by at least one function. The data storage area may store data created based on use of an electronic device. In addition, the memory 502 may include a high-speed random access memory, and may further include a non-transitory memory, such as at least one magnetic disk storage device, a flash memory device, or other non-transitory solid-state storage devices. In some embodiments, the memory 502 may optionally include a memory remotely provided with respect to the processor 501, and these remote memories may be connected, through a network, to the electronic device. Examples of the network include, but are not limited to, the Internet, the Intranet, a local area network, a mobile communication network, and a combination thereof.

The electronic device for implementing the image processing method may further include: an input device 503 and an output device 504. The processor 501, the memory 502, the input device 503 and the output device 504 may be connected to each other through a bus or in other ways. In FIG. 5, a bus for connection is used as an example.

The input device 503 may receive digital or character information that is inputted, and generate key signal input related to a user setting and function control of the electronic device for implementing the image processing method, such as a touch screen, a keypad, a mouse, a trackpad, a touchpad, and a pointing stick, one or more mouse buttons, a trackball, a joystick, or another input device. The output device 504 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

The various implementations of the system and technology described herein may be implemented in a digital electronic circuit system, an integrated circuit system, an application specific integrated circuit (ASIC), computer hardware, firmware, software, and/or a combination thereof. The various implementations may include: implementation in one or more computer programs that may be executed and/or interpreted by a programmable system including at least one programmable processor. The programmable processor may be a dedicated or general-purpose programmable processor, and may receive data and instructions from a storage system, at least one input device and at least one output device, and transmit the data and the instructions to the storage system, the at least one input device and the at least one output device.

These computing programs (also referred to as programs, software, software applications, or codes) include machine instructions of a programmable processor, and may be implemented by using procedure-oriented and/or object-oriented programming language, and/or assembly/machine language. As used herein, the terms "machine-readable medium" and "computer-readable medium" refer to any computer program product, apparatus, and/or device (e.g., a magnetic disk, an optical disc, a memory, a programmable logic device (PLD)) for providing machine instructions and/or data to a programmable processor, including a machine-readable medium that receives machine instructions implemented as machine-readable signals. The term "machine-readable signal" refers to any signal used to provide machine instructions and/or data to a programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique described herein), or that includes any combination of such back-end component, middleware component, or front-end component. The components of the system can be interconnected in digital data communication (e.g., a communication network) in any form or medium. Examples of communication network include a local area network (LAN), a wide area network (WAN) and the Internet.

A computer system may include a client and a server. The client and the server are generally far away from each other and usually interact through a communication network. The relationship between client and server arises by virtue of computer programs running on respective computers and having a client-server relationship with each other.

According to technical solutions in the embodiments of the present application, in an image pre-processing process, the Y-channel image, U-channel image and V-channel image in the converted three-channel YUV image may be processed by using the convolution operation to generate the three-channel RGB image. The three-channel RGB image is pre-processed. Thus, the time for converting the YUV image into RGB image may be shortened, thereby increasing the image pre-processing speed.

It may be appreciated that, all forms of processes shown above may be used, and steps thereof may be reordered, added or deleted. For example, as long as expected results of the technical solutions of the present application can be achieved, steps set forth in the present application may be performed in parallel, in sequence, or in a different order, and there is no limitation in this regard.

The foregoing specific implementations constitute no limitation on the protection scope of the present application. It is appreciated by those skilled in the art, various modifications, combinations, sub-combinations and replacements can be made according to design requirements and other factors. Any modifications, equivalent replacements and improvements made without deviating from the spirit and the principle of the present application shall fall within the protection scope of the present application.

What is claimed is:

1. An image processing method, comprising:
acquiring, via an input device, an image to be processed;
converting, via a processor, the image to be processed into a three-channel YUV image;
performing, via the processor, a convolution operation on a Y-channel image, a U-channel image and a V-channel image in the three-channel YUV image to generate an R-channel image, a G-channel image and a B-channel image, respectively, and acquiring a three-channel RGB image; and
pre-processing, via the processor, the three-channel RGB image,
wherein the converting the image to be processed into the three-channel YUV image comprises:
dividing the image to be processed into a first Y-channel image and a UV-channel image;
adjusting the first Y-channel image to acquire the Y-channel image of dimensions of (N, 1, W, H);
splitting the UV-channel image to acquire a U-channel image of dimensions of (N, 1, W*0.5, H*0.5) and a V-channel image of the dimensions of (N, 1, W*0.5, H*0.5);
performing double sampling on the U-channel image of the dimensions of (N, 1, W*0.5, H*0.5) and the V-channel image of the dimensions of (N, 1, W*0.5, H*0.5) to acquire the U-channel image of the dimensions of (N, 1, W, H) and the V-channel image of the dimensions of (N, 1, W, H) respectively; and
merging the Y-channel image of the dimensions of (N, 1, W, H), the U-channel image of the dimensions of (N, 1, W, H) and the V-channel image of the dimensions of (N, 1, W, H) to acquire the YUV image of dimensions of (N, 3, W, H); and
wherein, N represents the number of images to be processed, 1 represents that there is 1 channel in the Y-channel image, the U-channel image, or the V-channel image, 3 represents that there are 3 channels in the YUV image, W is a width of the image to be processed, and H is a height of the image to be processed.

2. The method according to claim 1, wherein the splitting the UV-channel image to acquire the U-channel image of the dimensions of (N, 1, W*0.5, H*0.5) and the V-channel image of the dimensions of (N, 1, W*0.5, H*0.5) comprises:
adjusting the UV-channel image to be a UV-channel image of dimensions of (N, 2, W*H*0.25);
splitting the UV-channel image of the dimensions of (N, 2, W*H*0.25) to acquire a U-channel image of dimensions of (N, 1, W*H*0.25) and a V-channel image of dimensions of (N, 1, W*H*0.25); and
adjusting the U-channel image of the dimensions of (N, 1, W*H*0.25) to be the U-channel image of the dimensions of (N, 1, W*0.5, H*0.5), and adjusting the V-channel image of the dimensions of (N, 1, W*H*0.25) to be the V-channel image of the dimensions of (N, 1, W*0.5, H*0.5).

3. The method according to claim 1, wherein the performing double sampling on the U-channel image of the dimensions of (N, 1, W*0.5, H*0.5) and the V-channel image of the dimensions of (N, 1, W*0.5, H*0.5) to acquire the U-channel image of the dimensions of (N, 1, W, H) and the V-channel image of the dimensions of (N, 1, W, H) respectively comprises:
  performing nearest neighbor double up-sampling on the U-channel image of the dimensions of (N, 1, W*0.5, H*0.5) and the V-channel image of the dimensions of (N, 1, W*0.5, H*0.5) by using a nearest interpolation function, to acquire the U-channel image of the dimensions of (N, 1, W, H) and the V-channel image of the dimensions of (N, 1, W, H), respectively.

4. The method according to claim 1, wherein the pre-processing the three-channel RGB image comprises:
  pre-processing the three-channel RGB image by using a batch normalization function.

5. The method according to claim 4, wherein the batch normalization function is:

$$\text{output} = \frac{\text{input} - \text{mean}}{\sqrt{\text{variance}^2 + \text{epsilon}}} * \text{scale} - \text{bias}$$

wherein, output represents a pixel value of a pre-processed image, input represents a pixel value of an image before being pre-processed, scale represents a scaling coefficient, bias represents a bias value, mean represents a mean value, variance represents a variance, and epsilon represents a preset numerical stability coefficient for division algorithm.

6. The method according to claim 1, wherein after acquiring the three-channel RGB image, the method further comprises:
  resizing the three-channel RGB image; and
  wherein the pre-processing the three-channel RGB image comprises:
  pre-processing the resized three-channel RGB image.

7. An image processing apparatus, comprising:
  at least one processor; and
  a memory communicatively connected to the at least one processor; wherein the memory stores an instruction executable by the at least one processor, and when executing the instruction, the at least one processor is configured to:
  acquire an image to be processed;
  convert the image to be processed into a three-channel YUV image;
  perform convolution operation on a Y-channel image, a U-channel image and a V-channel image in the three-channel YUV image to generate an R-channel image, a G-channel image and a B-channel image, respectively, and acquire a three-channel RGB image; and
  pre-process the three-channel RGB image,
  wherein the at least one processor is further configured to:
  divide the image to be processed into a first Y-channel image and a UV-channel image;
  adjust the first Y-channel image to acquire the Y-channel image of dimensions of (N, 1, W, H);
  split the UV-channel image to acquire a U-channel image of dimensions of (N, 1, W*0.5, H*0.5) and a V-channel image of the dimensions of (N, 1, W*0.5, H*0.5);
  perform double sampling on the U-channel image of the dimensions of (N, 1, W*0.5, H*0.5) and the V-channel image of the dimensions of (N, 1, W*0.5, H*0.5) to acquire the U-channel image of the dimensions of (N, 1, W, H) and the V-channel image of the dimensions of (N, 1, W, H) respectively; and
  merge the Y-channel image of the dimensions of (N, 1, W, H), the U-channel image of the dimensions of (N, 1, W, H) and the V-channel image of the dimensions of (N, 1, W, H) to acquire the YUV image of dimensions of (N, 3, W, H); and
  wherein, N represents the number of images to be processed, 1 represents that there is 1 channel in the Y-channel image, the U-channel image, or the V-channel image, 3 represents that there are 3 channels in the YUV image, W is a width of the image to be processed, and H is a height of the image to be processed.

8. The apparatus according to claim 7, wherein the at least one processor is further configured to:
  adjust the UV-channel image to be a UV-channel image of dimensions of (N, 2, W*H*0.25);
  split the UV-channel image of the dimensions of (N, 2, W*H*0.25) to acquire a U-channel image of dimensions of (N, 1, W*H*0.25) and a V-channel image of the dimensions of (N, 1, W*H*0.25); and
  adjust the U-channel image of the dimensions of (N, 1, W*H*0.25) to be the U-channel image of the dimensions of (N, 1, W*0.5, H*0.5), and adjusting the V-channel image of the dimensions of (N, 1, W*H*0.25) to be the V-channel image of the dimensions of (N, 1, W*0.5, H*0.5).

9. The apparatus according to claim 7, wherein the at least one processor is further configured to:
  perform nearest neighbor double up-sampling on the U-channel image of the dimensions of (N, 1, W*0.5, H*0.5) and the V-channel image of the dimensions of (N, 1, W*0.5, H*0.5) by using a nearest interpolation function, to acquire the U-channel image of the dimensions of (N, 1, W, H) and the V-channel image of the dimensions of (N, 1, W, H), respectively.

10. The apparatus according to claim 7, wherein the at least one processor is further configured to:
  pre-process the three-channel RGB image by using a batch normalization function.

11. A non-transitory computer-readable storage medium of stored a computer instruction thereon, wherein the computer instruction is configured to be executed to cause a computer to perform following steps:
  acquiring an image to be processed;
  converting the image to be processed into a three-channel YUV image;
  performing a convolution operation on a Y-channel image, a U-channel image and a V-channel image in the three-channel YUV image to generate an R-channel image, a G-channel image and a B-channel image, respectively, and acquiring a three-channel RGB image; and
  pre-processing the three-channel RGB image,
  wherein when converting the image to be processed into the three-channel YUV image, the computer instruction is further configured to be executed to cause a computer to perform following steps:
  dividing the image to be processed into a first Y-channel image and a UV-channel image;
  adjusting the first Y-channel image to acquire the Y-channel image of dimensions of (N, 1, W, H);
  splitting the UV-channel image to acquire a U-channel image of dimensions of (N, 1, W*0.5, H*0.5) and a V-channel image of the dimensions of (N, 1, W*0.5, H*0.5);

performing double sampling on the U-channel image of the dimensions of (N, 1, W*0.5, H*0.5) and the V-channel image of the dimensions of (N, 1, W*0.5, H*0.5) to acquire the U-channel image of the dimensions of (N, 1, W, H) and the V-channel image of the dimensions of (N, 1, W, H) respectively; and merging the Y-channel image of the dimensions of (N, 1, W, H), the U-channel image of the dimensions of (N, 1, W, H) and the V-channel image of the dimensions of (N, 1, W, H) to acquire the YUV image of dimensions of (N, 3, W, H); and wherein, N represents the number of images to be processed, 1 represents that there is 1 channel in the Y-channel image, the U-channel image, or the V-channel image, 3 represents that there are 3 channels in the YUV image, W is a width of the image to be processed, and H is a height of the image to be processed.

12. The non-transitory computer-readable storage medium according to claim 11, wherein when splitting the UV-channel image to acquire the U-channel image of the dimensions of (N, 1, W*0.5, H*0.5) and the V-channel image of the dimensions of (N, 1, W*0.5, H*0.5), the computer instruction is further configured to be executed to cause the computer to perform following steps:

adjusting the UV-channel image to be a UV-channel image of dimensions of (N, 2, W*H*0.25);

splitting the UV-channel image of the dimensions of (N, 2, W*H*0.25) to acquire a U-channel image of dimensions of (N, 1, W*H*0.25) and a V-channel image of dimensions of (N, 1, W*H*0.25); and adjusting the U-channel image of the dimensions of (N, 1, W*H*0.25) to be the U-channel image of the dimensions of (N, 1, W*0.5, H*0.5), and adjusting the V-channel image of the dimensions of (N, 1, W*H*0.25) to be the V-channel image of the dimensions of (N, 1, W*0.5, H*0.5).

13. The non-transitory computer-readable storage medium according to claim 11, wherein when performing double sampling on the U-channel image of the dimensions of (N, 1, W*0.5, H*0.5) and the V-channel image of the dimensions of (N, 1, W*0.5, H*0.5) to acquire the U-channel image of the dimensions of (N, 1, W, H) and the V-channel image of the dimensions of (N, 1, W, H) respectively, the computer instruction is further configured to be executed to cause the computer to perform following steps:

performing nearest neighbor double up-sampling on the U-channel image of the dimensions of (N, 1, W*0.5, H*0.5) and the V-channel image of the dimensions of (N, 1, W*0.5, H*0.5) by using a nearest interpolation function, to acquire the U-channel image of the dimensions of (N, 1, W, H) and the V-channel image of the dimensions of (N, 1, W, H), respectively.

14. The non-transitory computer-readable storage medium according to claim 11, wherein when pre-processing the three-channel RGB image, the computer instruction is further configured to be executed to cause the computer to perform following steps:

pre-processing the three-channel RGB image by using a batch normalization function.

15. The non-transitory computer-readable storage medium according to claim 14, wherein the batch normalization function is:

$$\text{output} = \frac{\text{input} - \text{mean}}{\sqrt{\text{variance}^2 + \text{epsilon}}} * \text{scale} - \text{bias}$$

wherein, output represents a pixel value of a pre-processed image, input represents a pixel value of an image before being pre-processed, scale represents a scaling coefficient, bias represents a bias value, mean represents a mean value, variance represents a variance, and epsilon represents a preset numerical stability coefficient for division algorithm.

16. The non-transitory computer-readable storage medium according to claim 11, wherein after acquiring the three-channel RGB image, the computer instruction is configured to be executed to cause the computer to perform following steps:

resizing the three-channel RGB image;

wherein the pre-processing the three-channel RGB image comprises:

pre-processing the resized three-channel RGB image.

* * * * *